US007621819B1

(12) United States Patent
Neu

(10) Patent No.: US 7,621,819 B1
(45) **Date of Patent: *Nov. 24, 2009**

(54) MULTIPLE PURPOSE GOLF TOOL

(76) Inventor: Kenneth Neu, 7430 Lake Breeze Dr., Fort Myers, FL (US) 33907

( * ) Notice: Subject to any disclaimer, the term of this patent is extended or adjusted under 35 U.S.C. 154(b) by 0 days.

This patent is subject to a terminal disclaimer.

(21) Appl. No.: 12/157,693

(22) Filed: Jun. 12, 2008

Related U.S. Application Data

(63) Continuation-in-part of application No. 11/825,810, filed on Jul. 9, 2007, now Pat. No. 7,527,563.

(51) Int. Cl.

| | |
|---|---|
| ***A63B 55/10*** | (2006.01) |
| ***B25B 23/00*** | (2006.01) |
| ***A45F 3/44*** | (2006.01) |
| ***A01B 1/00*** | (2006.01) |

(52) U.S. Cl. ......................... 473/282; 473/286; 81/460; 248/156; 172/375; 172/378

(58) Field of Classification Search ......... 473/282–286, 473/408; D21/793, 796; 81/460; 248/156, 248/530; 172/378, 375
See application file for complete search history.

(56) References Cited

U.S. PATENT DOCUMENTS

| | | | | | |
|---|---|---|---|---|---|
| D239,304 | S | * | 3/1976 | Jackson | D21/793 |
| D247,790 | S | * | 4/1978 | Jackson | D21/794 |
| 4,535,987 | A | * | 8/1985 | Dikoff | 473/406 |
| 4,908,899 | A | * | 3/1990 | Killen | 15/105 |
| D308,713 | S | * | 6/1990 | Sherry | D21/793 |
| 5,226,647 | A | * | 7/1993 | Notarmuzi | 473/284 |
| 5,643,113 | A | * | 7/1997 | Rodgers | 473/386 |
| 5,645,500 | A | * | 7/1997 | Borden | 473/408 |
| D401,296 | S | * | 11/1998 | Cole et al. | D21/793 |
| 6,004,229 | A | * | 12/1999 | Fazekas | 473/406 |
| 6,270,424 | B1 | * | 8/2001 | Holub | 473/286 |
| 6,290,617 | B1 | * | 9/2001 | Cole et al. | 473/408 |
| 6,413,173 | B1 | * | 7/2002 | Muller et al. | 473/408 |
| 6,546,981 | B2 | * | 4/2003 | Cameron | 150/160 |
| 6,565,458 | B1 | * | 5/2003 | Cameron | 473/408 |
| 6,688,505 | B1 | * | 2/2004 | Bradley et al. | 224/230 |
| 2003/0207730 | A1 | * | 11/2003 | Braithwaite | 473/408 |
| 2004/0092340 | A1 | * | 5/2004 | Kvitek | 473/406 |
| 2005/0202897 | A1 | * | 9/2005 | McGonigle | 473/285 |

* cited by examiner

*Primary Examiner*—Stephen L. Blau

(57) ABSTRACT

Performance of at least four (4) useful functions are provided for by a multiple purpose golf tool. The first useful function being release of compression of turf associated with an impact from a golf ball. The remaining useful functions include supporting at least the grip of the club about the ground, applying a rotational pressure to a slot of a slotted head screw or applying a rotational pressure to a phillips slot of a phillips slotted head screw or club face groove cleaning or golf shoe spike cleaning or sharpening of a pencil or removal of a bottle cap from a bottle or lifting a beverage can pull tab relative to the beverage can or install and removal of a golf shoe spike relative to a golf shoe. The multiple purpose golf tool may be stored on a shaft of a putter directly below a grip of the putter.

19 Claims, 12 Drawing Sheets

FIG. 1e
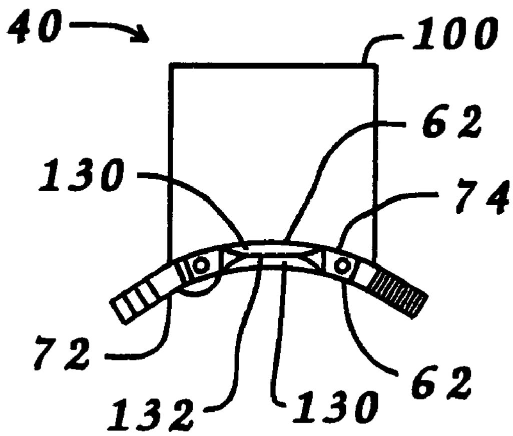
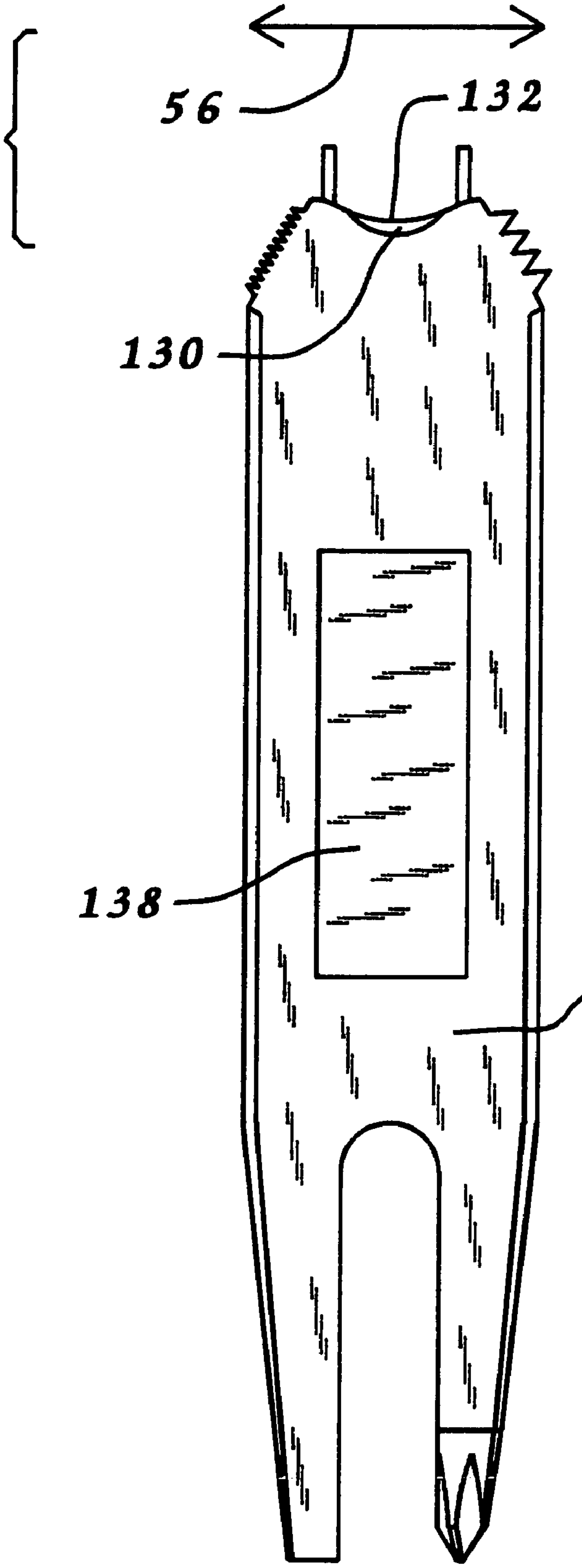
FIG. 1d

FIG. 3b
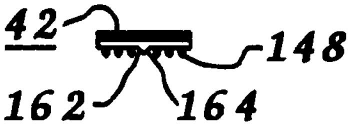
FIG. 3a
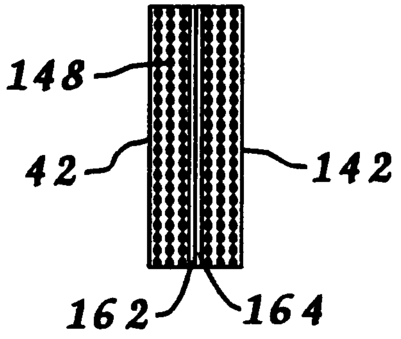
FIG. 3c
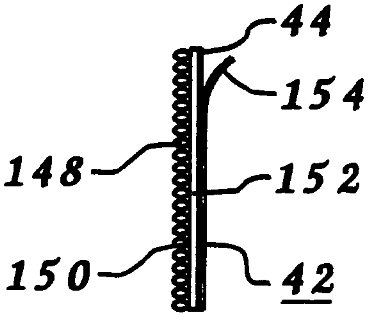
FIG. 4b
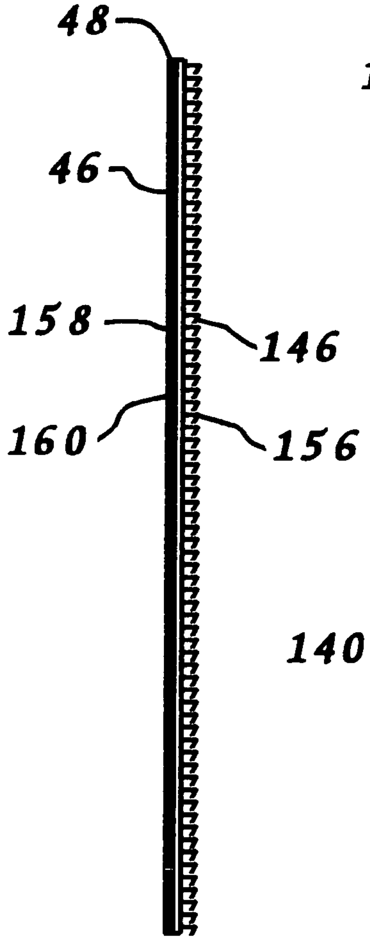
FIG. 4c
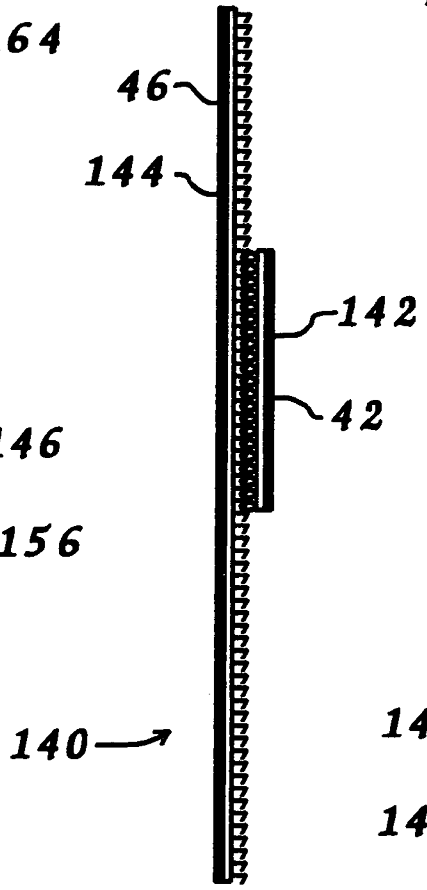
FIG. 2
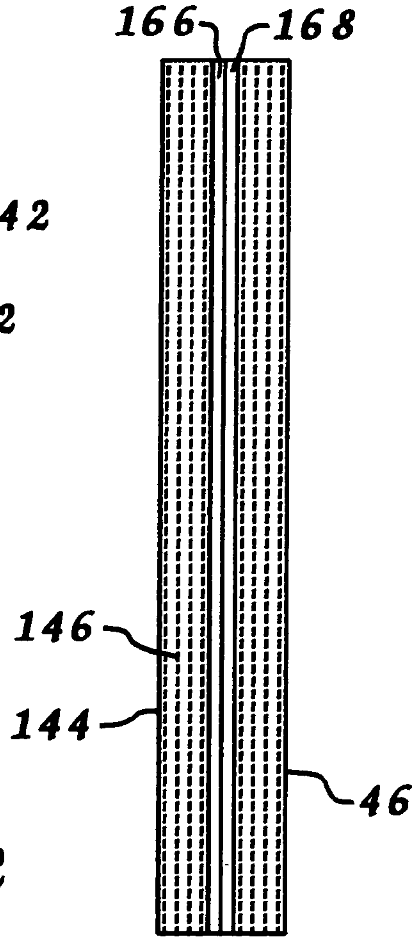
FIG. 4a FIG. 13
'Prior Art'
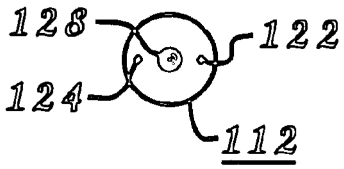
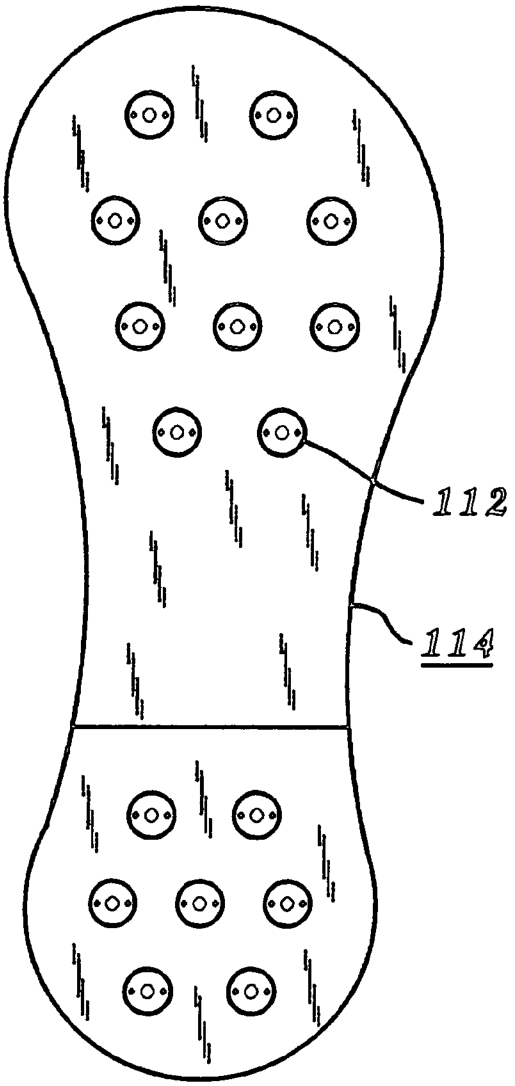
FIG. 12
'Prior Art'
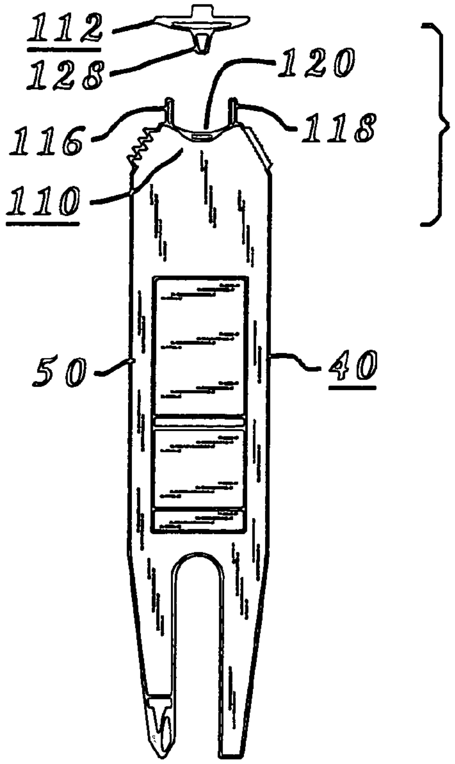
FIG. 14a
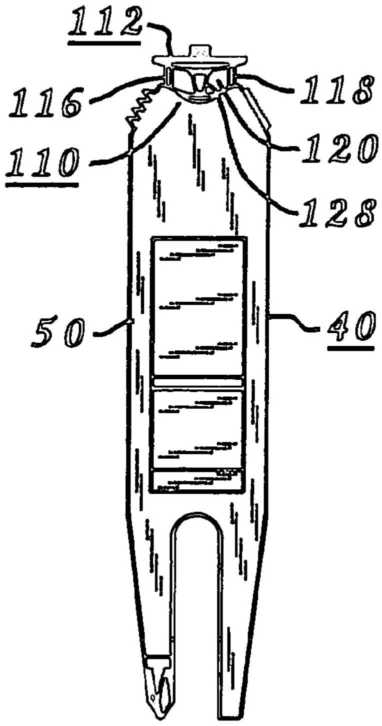
FIG. 14b

MULTIPLE PURPOSE GOLF TOOL

CROSS-REFERENCE

This application is a continuation-in-part of Ser. No. 11/825,810 filed Jul. 9, 2007, entitled "Golf Tool Storage on Putter", currently pending. The original application is incorporated herein by this reference.

BACKGROUND

1. Field of the Invention

Generally, the invention relates to tools utilized during the playing of golf. More specifically, the invention relates to tools utilized at least during play on greens of golf courses and configured to perform at least four (4) useful functions.

2. Description of the Prior Art

The game of golf is enjoyed by many persons. Such players range from beginner players to occasional recreational players to serious recreational players to serious amateur players to professional players. Many regular non-professional players, including retired or semi-retired persons, routinely enjoy the game of golf on a very regular basis. It is common to have players of golf living in communities which have at least one golf course owned and operated by the community. Such players often enjoy a round of golf on a very regular schedule, including daily.

Numerous tools, including divot tools, exist to assist golfers during the play of the game of golf. Golfers typically utilize a collection of golf clubs during play which include woods, irons and a putter. Normally such clubs are retained in a golf bag during storage, transport to and from the playing areas of golf courses, and during movement about the golf course during play. Numerous designs of golf bags exist in the art with areas for placement of the golf clubs and various other objects associated with the play of golf, such other objects including various tools utilized during the play of the game of golf. Various of these tools are occasionally carried about on the person of the player, either in a pocket of clothing or otherwise attached to clothing, such as in belt clips.

All golf courses employ persons to tend to and care for their golf course including providing for the care and maintenance of the vegetation associated with the course. This includes watering and mowing of the grass of the fairways and greens and the grass about the fairways and greens. The greens are particularly important to both the personnel of the golf course and to the players. Each player, at each of the holes of a golf course, move their ball from the tee along a fairway to the green and eventually into the cup. During such play a lofted shot will often land on the green where the impact of the ball, depending upon the distance stuck and the height obtained, will compress the well manicured grass of the green, and the soil underneath, at the point of impact. This point of impact, beyond being an impediment to subsequent players putting across this point to reach the cup, will actually damage the green if the compression is not relieved relatively quickly. It is known to have at least some of the grass at such untended impact points actually die. Experienced and considerate players of golf take great care to ensure that they do not damage the golf course, including the greens. Therefore, most players carry and routinely use a divot tool to manually release the compacting pressure caused by divots created by their respective play. Most serious players, when they notice a divot on a green which they, or their party, did not cause will routinely tend to the noted divot and release the compacting pressure of the divot.

It is known to provide tools have various capabilities. Tools are known in the art to provide for performance of each of these useful functions, divot repair, club support, club face groove cleaning, golf shoe spike cleaning, golf shoe spike installation and removal, rotationally manipulating a phillips head screw, rotationally manipulating a slotted head screw, removing a bottle cap from a bottle, sharpening a pencil and lifting a pull tab from a beverage can.

Various of the above mentioned useful functions are occasionally desired to be performed during the play of the game of golf. Few players would even consider taking along individual tools to perform all of these useful functions. Some multi purpose tools are known in the art having numerous functional capabilities. An excellent example is the multi purpose tool where pivotal manipulation from a housing transfers portions between a stored orientation and a deployed orientation. While very versatile, these tools are awkward to manipulate to bring the desired portion having the desired feature into the deployed orientation. Additionally, following performance of the desired useful function the deployed portion must then be returned to the respective stored orientation. All of this is time consuming and may even result in injury to the user, such as damage to fingernails used during initial transfer of the portion from the stored orientation to the deployed orientation. A far better solution resides in placing structures to perform all of the desired useful functions on a single tool without any moving parts which must be manipulated.

Referring now to storage of tools, the above mentioned desire by most players to prevent damage to the greens creates a problem for many golfers. Due to the nature of play many players do not like to carry objects, even small objects such as divot tools, in their pockets during play as they tend to inhibit, even if merely moderately, a full swing from the tee and from the fairways and from bunkers. Many players leave their golf bags on golf carts which are never driven onto greens, but rather are parked a considerable distance from the respective green on or near a cart path. Many players who carry their golf bags, or walk them around the course on wheeled carts, also never take the golf bags physically onto the greens but leave them adjacent to the greens. Many players routinely remove their putter and their divot tool from their golf bag prior to going onto the green. During the excitement of play, even frequent players will occasionally forget to retrieve their divot tool prior to going onto the green. Therefore, when a player arrives on the green their divot tool will often be in their golf bag which has been left a considerable distance away.

It has been suggested in the art to attach a divot tool to a putter where the divot tool will always be available to the player while carrying the putter, including while on a respective green. Various Patents have provided for attachment of a divot tool to the handle of a golf club, including putters, where the tines extend beyond the end of the grip. This provides for the player to hold the head of the club and manipulate the divot tool without requiring bending over or squatting down. While interesting these class of devices do not provide for storage of the divot tool during actual play with the club. Typically players would be distracted to actually putt with one of these divot tools attached to the end of the grip of the putter. Various Patents have placed the storage location on the putter head behind the striking surface. At least one of these Patents placed the divot tool in the stored state extending outward behind the head of the putter where it would also act as an aiming guide to assist the player in proper ball striking. Several Patents have taught building a divot tool into the putter, either on the head or in the end of the grip. When placed on the head a common deployment arrangement involves arcing the divot tool outward from a storage location in a general one hundred and eighty (180) degree swing from an anchoring pivot pin. A common problem with building a divot tool into a putter is that the player then does not have the freedom to change putters to find the best design and construction for their respective needs, desires and style of play. Therefore, prior art references which incorporate a divot tool into the design and manufacture of putters are not applicable to the present invention. A more relevant prior art Patent suggested detachable attachment of a divot tool to the shaft of the putter in close proximity to the head of the putter. This prior art reference taught a mere pressure clip attachment which permits the divot tool to rotate about the shaft where it might distract the player during putting.

Various deficiencies exist with each of the known methods of providing tools capable of performing desired useful functions during the play of the game of golf. As can be seen various attempts have been made to provide for a player with tools for use during play of the game of golf. These attempts have been less efficient than desired. As such, it may be appreciated that there continues to be a need for a multiple purpose tool capable of being readily carried about by the player and which has no moving parts which the player must manipulate in order to utilize the multiple purpose tool to perform any of the desired useful functions. The present invention substantially fulfills these needs.

SUMMARY

In view of the foregoing disadvantages inherent in the known methods of providing access to tool functions to players during the play of the game of golf, your applicant has devised a multiple purpose golf tool which has no moving parts and which provides the player with various desired useful functions. A multiple purpose golf tool provides for performance of multiple useful functions during play of the game of golf. The multiple purpose golf tool will have a turf penetration portion to perform a first useful function associated with the play of the game of golf and structural configurations to independently perform a second, third and fourth useful function associated with the play of the game of golf. The first useful function involves release of compression of turf associated with an impact from a golf ball. During performance of this action the turf penetration portion is inserted into the turf at a point of insertion and then manual manipulation of the multiple purpose golf tool occurs to displace the turf penetration portion while inserted in the turf to release the compression of the turf about the point of insertion of the turf penetration portion.

My invention resides not in any one of these features per se, but rather in the particular combinations of them herein disclosed and it is distinguished from the prior art in these particular combinations of these structures for the useful functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for players of golf to have ready and convenient access to an easy to use multiple purpose golf tool having at least the ability to perform turf repair on divots on greens and the ability to perform at least three (3) other useful functions.

Other objects include;

a) to provide for the multiple purpose golf tool to be small and compact and of a one piece design without any moving parts where the player will feel comfortable transporting the multiple purpose golf tool around with them during the play of the game of golf.

b) to provide for a multiple purpose golf tool having a divot repair tool incorporated thereon.

c) to provide for the multiple purpose golf tool to optionally have a club support tool incorporated thereon.

d) to provide for the multiple purpose golf tool to optionally have a club face groove cleaner tool incorporated thereon.

e) to provide for the multiple purpose golf tool to optionally have a golf shoe spike cleaner tool incorporated thereon.

f) to provide for the multiple purpose golf tool to optionally have a golf shoe spike install/removal tool incorporated thereon.

g) to provide for the multiple purpose golf tool to optionally have a phillips head screwdriver tool incorporated thereon.

h) to provide for the multiple purpose golf tool to optionally have a slotted head screwdriver tool incorporated thereon.

i) to provide for the multiple purpose golf tool to optionally have a bottle opener tool incorporated thereon.

j) to provide for the multiple purpose golf tool to optionally have a pencil sharpener tool incorporated thereon.

k) to provide for the multiple purpose golf tool to optionally have a beverage can pull tab lifter tool incorporated thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1*d* is a rear elevational view of the multiple purpose golf tool.

FIG. 1*e* is a top plan view of the multiple purpose golf tool.

FIG. 2 is a side elevational view of a first coupling member and second coupling member in a coupled state.

FIG. 3*a* is a front elevational view of the first coupling member.

FIG. 3*b* is a top plan view of the first coupling member.

FIG. 3*c* is a side elevational view of the first coupling member.

FIG. 4*a* is a front elevational view of the second coupling member.

FIG. 4*b* is a top plan view of the second coupling member.

FIG. 4*c* is a side elevational view of the second coupling member.

FIG. 12 is a plan view of the bottom of a golf shoe and labeled as 'Prior Art'.

FIG. 13 is a plan view of the bottom of a spike member as used on the golf shoe depicted in FIG. 12 and labeled as 'Prior Art'.

FIG. 14*a* and FIG. 14*b* are front elevational views of the multiple purpose golf tool and the spike member shown in FIG. 13 as would occur during a spike member adjustment procedure.

DESCRIPTION

Figure 1A:
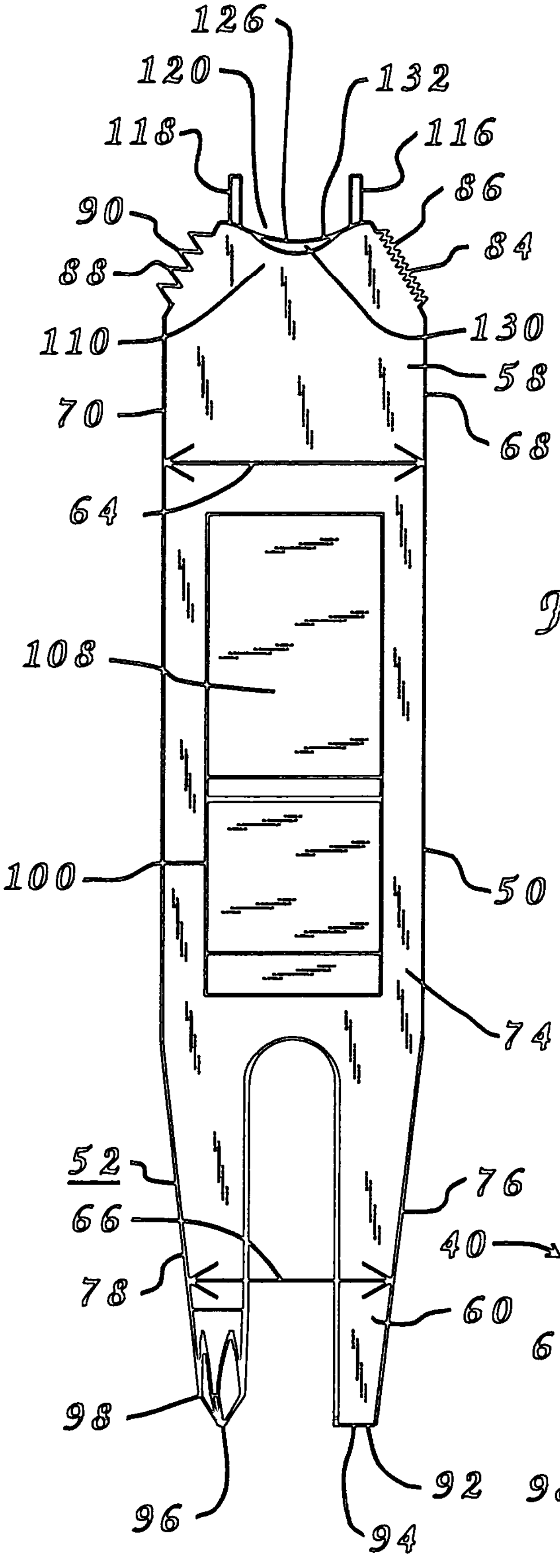
FIG. 1*a* is a front elevational view of a multiple purpose golf tool.

Many different devices having features of the present invention are possible. The following description describes the preferred embodiment of select features of those devices and various combinations thereof. These features may be deployed in various combinations to arrive at various desired working configurations of devices.

Reference is hereafter made to the drawings where like reference numerals refer to like parts throughout the various views.

Structural configurations will be provided on a multiple purpose golf tool, having features of the present invention, to perform respective useful functions associated with the play of the game of golf.

Any golf club can be utilized with the present invention although preferably putter type clubs will be used. There are two reasons for this preference. The first reason is that putters, unlike all of the other club selections, typically is utilized with relatively short strokes rather than full swings. Therefore the additional weight of the tool attached relatively high up on the shaft in close proximity to the grip will have very little effect upon the stroke. The second reason is that putters are utilized on greens where the player will often have need of the various useful functions which might be performed with the aid of the multiple purpose golf tool, including the useful function of divot repair. The golf club is merely a workpiece with which the present invention useful functions.

Figures 5A, 5B, 5C:
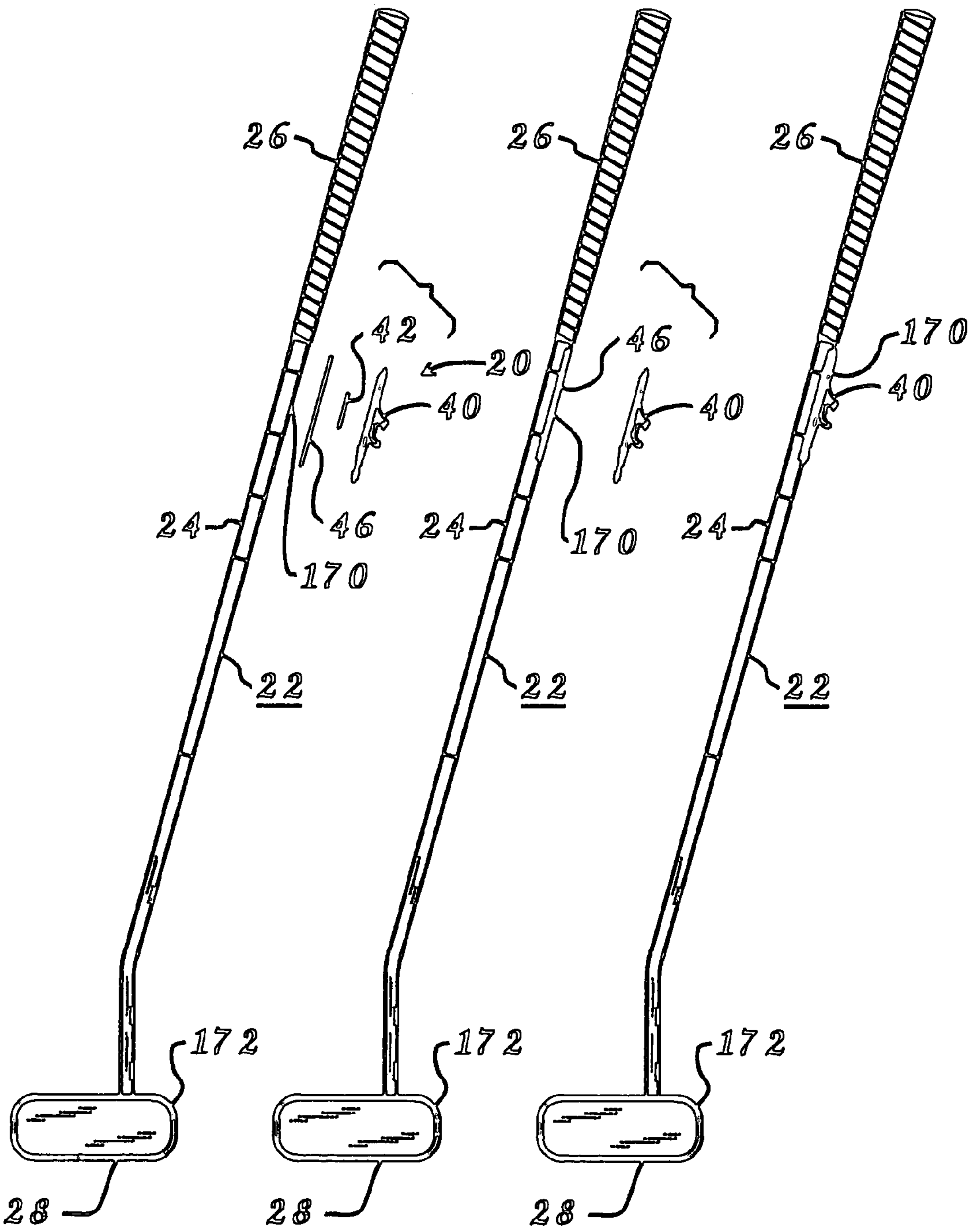
FIG. 5*a* through FIG. 5*c* are side elevational views of a golf club and the assembly having the multiple purpose golf tool, the first coupling member and the second coupling member in various orientations.
Figure 6A:
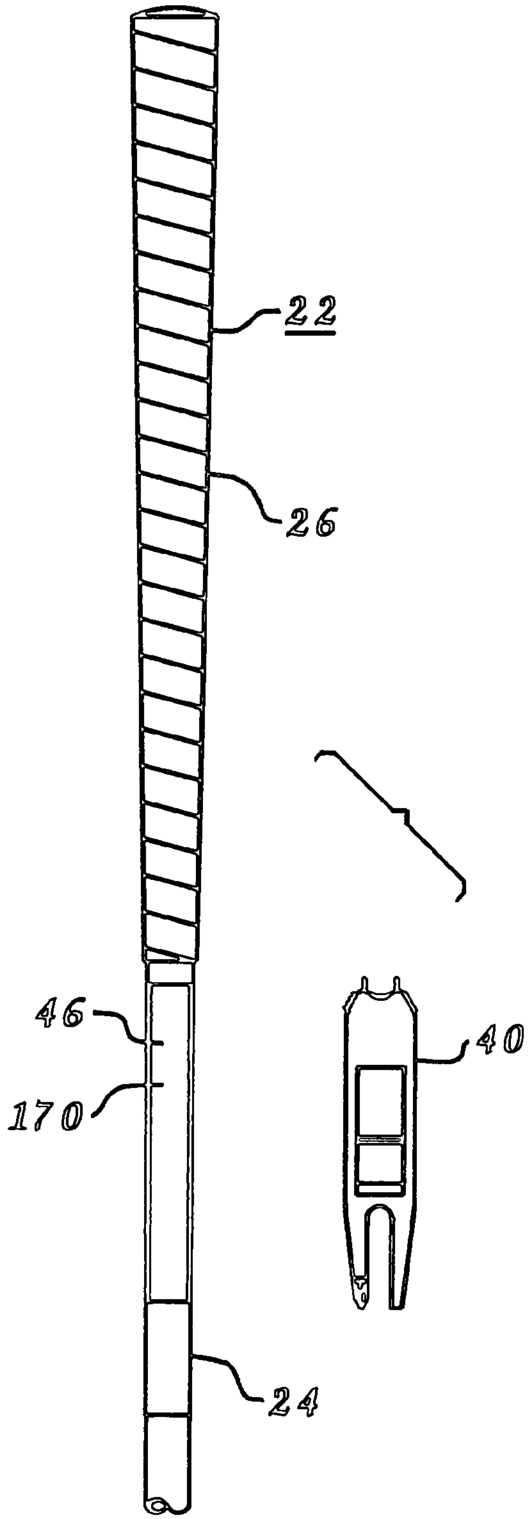
FIG. 6*a* and FIG. 6*b* are rear elevational views of a portion of the golf club with the multiple purpose golf tool in a detached orientation and an attached orientation.
Figure 6B:
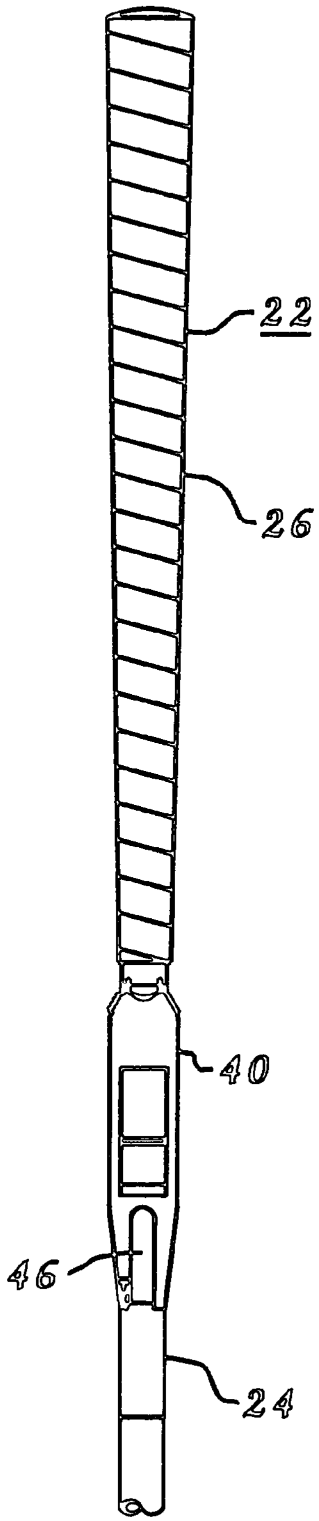
Figure 7:
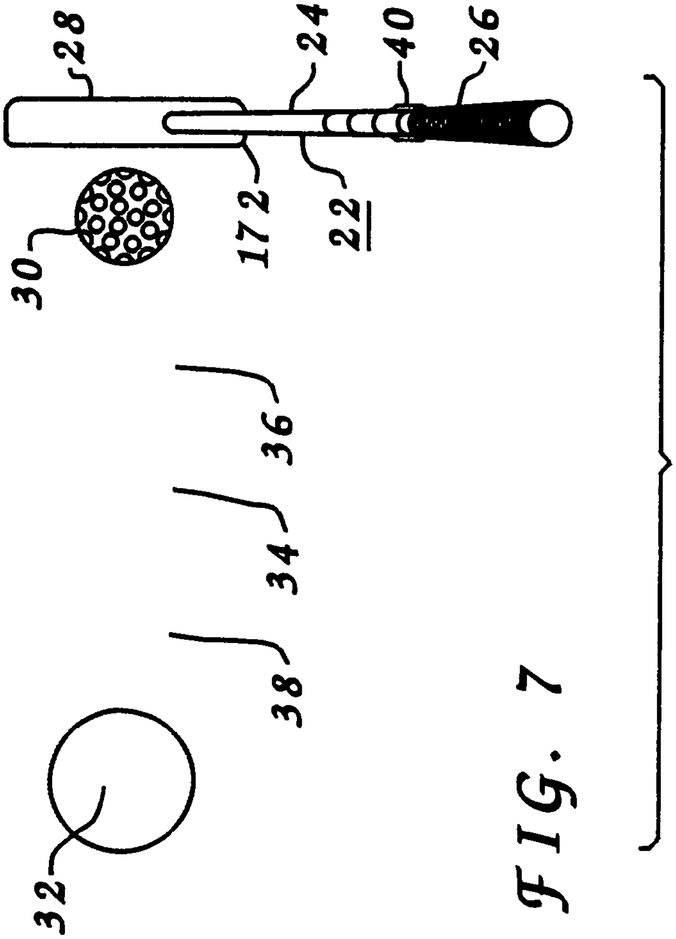
FIG. 7 is an overhead plan view of the golf club, with the multiple purpose golf tool attached, prepared to strike a golf ball during the play of the game of golf.

FIG. 5*a* depicts an assembly 20 of the present invention ready to be attached to a golf club 22. Golf club 22 is depicted as a putter type club although any golf club may be used. Golf club, putter, 22 has a shaft 24, a grip 26 and a head 28. Various conditions of operation exist for golf club 22. A transport of the golf club may occur where stored in a golf bag, not shown, or merely carried about by the player, not shown in any of the views. FIG. 7 depicts play with golf club 22 where golf club 22 is manipulated by the player, not shown, while a stroke is made to move a golf ball 30 toward a hole 32 within turf 34 of a green 36 of a golf course 38.

The assembly will have a multiple purpose golf tool, opposing coupling members and a way of attaching the coupling members to the shaft of a golf club and to the multiple purpose golf tool respectively. The attachment methods selected for the opposing coupling members may be identical or unique. The opposing coupling members may be selected from any applicable dual piece coupling assemblies conventionally known in the art. Applicable coupling members will have structures which permit cooperation to retain the members together while permitting selective detachment and reattachment. One example of such a coupling assembly involves opposing magnets or a magnet attached to either the shaft of the golf club or the multiple purpose golf tool with attraction to the metallic structure of the opposing structural element, either the shaft of the golf club or the multiple purpose golf tool.

A preferred selection for the coupling members involves hook and loop type fasteners, commonly referred to as Velcro. Hook and loop type fasteners have certain characteristics which make it an extremely desirable choice for the present invention. Hook and loop type fasteners are flexible and capable of being deployed on curved surfaces. This is particularly desirable for attachment to the shaft of the golf club and for attachment to the multiple purpose golf tool, which in a preferred embodiment has a curvature thereacross. Hook and loop type fasteners are readily available with an adhesive on the surface opposing the functional fastener side with a peel off protective sheet covering this adhesive until installation. Hook and loop type fasteners typically hold up to repetitive attachment and detachment cycles while retaining their retention properties. Hook and loop type fasteners utilizing the adhesive backing are easily removed when the retention properties of the hook material and/or the loop material begin to deteriorate. This easy removal permits installation of new hook and loop type fastener materials to replace the removed fastener materials. Hook and loop type fasteners also hold up well to exposure to environmental condition, as is common when outside playing a round of golf.

FIG. 5*a* through FIG. 5*c* depict all of the components of assembly 20 including installation on shaft 24 of golf club 22. A multiple purpose golf tool 40 is depicted having a first coupling member 42 attached thereto utilizing an adhesive material 44 as conventionally known in the art. A second coupling member 46 is depicted attached to shaft 24 of golf club 22 utilizing an adhesive material 48 as conventionally known in the art.

Depending upon the selection of coupling members, first coupling member attachment means to attach the first coupling member to the tool may be any conventionally known attachment method while second coupling member attachment means to attach the second coupling member to the golf club may be any conventionally known attachment method.

Assembly 20 provides for removable attachment of a portion, multiple purpose golf tool 40 and first coupling member 42, of assembly 20 to shaft 24 of golf club 22 in close proximity to grip 26 of golf club 22 during transport of golf club 22 and during actual play with golf club 22 where the stored first portion of assembly 20 does not interfere with actual play with golf club 22.

Preferably each multiple purpose golf tool of the present invention will have structural elements to permit repair of divots on the greens where an impact of a golf ball from a lofted shot compresses the soil and the root system of grass in the soil of the turf. Conventional divot tool often have two tines extending from a gripping portion where the user slides the tines into the turf and gently manipulates the tool to lift the root system of the effected grass to release the pressure.

Depending upon the structures to perform specific useful functions positioned on applicable multiple purpose golf tools numerous configurations are possible. It is a strong preference that the resulting multiple purpose golf tool be relatively narrow, so as to be inconspicuous when secured relative to the shaft of the golf club. It is also a strong preference that the resulting multiple purpose golf tool be relatively long, so as to be easily manipulated by the user.

Multiple purpose golf tool 40 is depicted as having numerous optional features positioned thereon to perform numerous useful functions associated with the play of the game of golf. Multiple purpose golf tool 40 has a grip portion 50 and a turf penetration portion 52. Multiple purpose golf tool 40 has a longitudinal orientation 54 and a lateral orientation 56. At opposing ends of longitudinal orientation 54 are an upper end 58 and a lower end 60 with upper end 58 being on grip portion 50. A curvature 62 extends across at least a portion of lateral orientation 56 along at least a substantial portion of grip portion 50. Curvature 60 provides for contouring attachment of multiple purpose golf tool 40 to shaft 24 of golf club 22. Upper end 58 has a lateral width 64 while lower end 60 has a lateral width 66 with lateral width 64 of upper end 58 substantially greater than lateral width 66 of lower end 60. Grip portion 50 has a first lateral edge 68 and a second lateral edge 70. Multiple purpose golf tool 40 has an inner surface 72 which is in closest proximity to shaft 24 of golf club 22 while multiple purpose golf tool 40 is in attachment relative to golf club 22. Opposing inner surface 72 on multiple purpose golf tool 40 is an outer surface 74.

The lines presented in the various views for longitudinal orientation 54, lateral orientation 56, lateral width 64 and lateral width 66 have been included to further explain features of the present invention and the lines form no structural part of the embodiment depicted.

Turf penetration portion 52 of multiple purpose golf tool 40 further comprises opposing tines 76 and 78 which extend away from grip portion 50. Turf penetration portion 52 provides for multiple purpose golf tool 40 to be manually manipulated to insert turf penetration portion 52 into turf 34 of golf course 38 then manually manipulated to release a compression 80 of turf 34 about a point of insertion 82.

Grip portion 50 of multiple purpose golf tool 40 has a series of protrusions 84 having a first configuration measurement 86 positioned on first lateral edge 68 at upper end 58. Grip portion 50 of multiple purpose golf tool 40 further has a series of protrusions 88 having a second configuration measurement 90 positioned on second lateral edge 70 at upper end 58. First configuration measurement 86 is substantially unique from second configuration measurement 90 where series of protrusions 84 on first lateral edge 68 may be used for a first cleaning operation performed on a piece of golf equipment, not shown, and where series of protrusions 88 on second lateral edge 70 may be used for a second cleaning operation performed on another piece of golf equipment, also not shown.

Examples of golf equipment which may have a cleaning operation performed thereon include the face, including trenches or other patterns, of heads of golf clubs which may gather soil and other debris thereon, and the soles of golf shoes, including about spikes positioned thereon. When a lateral curvature is provided on the multiple purpose golf tool the area of the multiple purpose golf tool about the protrusions may be flattened where the tips of each respective set of protrusions are linearly aligned along their entire length for performance of convenient cleaning operations.

Tine 76 has an end 92 having positioned thereon a slotted head screw driving configuration 94 where end 92 of tine 76 may be utilized as a slotted screw driver to manipulate a slotted head screw, not shown, during tightening or loosening of the slotted head screw. Tine 78 has an end 96 having positioned thereon a Phillips head screw driving configuration 98 where end 96 of tine 78 may be utilized as a Phillips screw driver to manipulate a Phillips head screw, not shown, during tightening or loosening of the Phillips head screw.

When a Phillips head screw driving configuration is provided it is possible to plane of the opposing side extending outward relative to the outer surface and the inner surface of the multiple purpose golf tool to reduce the profile of the multiple purpose golf tool while retaining the useful function of the Phillips head screw driving configuration.

When a slotted head screw driving configuration is provided on one tine and a Phillips head screw driving configuration is provided on the opposing tine it is possible to angularly offset these configurations one to the other to provide more clearance to reach the respective fasteners during usage.

Outer surface 74 of multiple purpose golf tool 40 has positioned thereon a bottle opening configuration 100. Bottle opening configuration 100 is capable of engagement of a bottle cap 102 to apply a pivotal pressure to a lip 104 of bottle cap 102 to remove bottle cap 102 from a bottle 106. Bottle opening configuration 100 further has a sloped surface 108 extending smoothly from outer surface 74 of multiple purpose golf tool 40. Sloped surface 108 makes an ideal thumb positioning location for the user during performance of many operations with multiple purpose golf tool 40, including during divot repair operations. It being understood that bottle 106 and bottle cap 102 are workpieces and form no part of the present invention.

Upper end 58 of multiple purpose golf tool 40 has positioned thereon a spike member manipulation configuration 110 to provide for manipulation of a spike member 112 positioned on a golf shoe 114. Spike member manipulation configuration 110 has opposing pins 116 and 118 with a recess 120 positioned between pins 116 and 118. During a tightening or loosening operation performed on spike member 112 pins 116 and 118 penetrate indentations 122 and 124 on spike member 112 while recess 120 accommodates placement of a spike 128 of spike member 112. During such placement multiple purpose golf tool 40 may be manipulated to impart a tightening rotation to spike member 112 or a loosening rotation to spike member 112. It being understood that spike member 112 and golf shoe 114 are workpieces and form no part of the present invention.

Recess 120 is partially defined by an upper protected edge 126 of grip portion 50 of multiple purpose golf tool 40. Upper protected edge 126 is protected against most incidental contact with other objects by pins 116 and 118. Upper protected edge 126 has a taper 130 which results in a sharp edge 132 which may be used for various useful cutting purposes. One example of such a useful cutting purpose involves sharpening a pencil 134 during the play of the game of golf. Due to the spacing between pins 116 and 118 pencil 134 may be easily inserted therebetween and drawn downward along sharp edge 132 to remove material from pencil 134 until a point 136 is to a desired configuration on pencil 134.

Beverage cans have evolved where most such cans currently have a flip type tab which when pivoted upward causes another tab portion to be pushed downward into the can to provide an opening in the can for the contents to pass through. Many designs for the flip type tab have been proposed and are currently in commercial usage. Typically such flip type tabs reside quite close to the top of the can prior to being utilized to open the can. It has been observed that many users have a difficult time with initial displacement of such flip type tabs away from their very close orientation with the top of the can. Often users will attempt to utilize a fingernail to perform the initial displacement operation. It has been known to have damage occur to the fingernail during such operations.

It is known to utilize a structural element, with various prior art references specifically directed toward this single useful function, to perform at least the initial tab displacement operation. Referring now to the present invention one of the tines, most likely the one with the slotted head screw driving configuration thereon, may be utilized to perform this initial displacement operation on flip type tabs on beverage cans. Alternatively, one of the series of protrusions on the lateral edges may be utilized to perform this initial displacement operation on flip type tabs on beverage cans. Alternatively, one, or both, of the pins of the spike member manipulation configuration may be utilized to perform this initial displacement operation on flip type tabs on beverage cans.

The multiple purpose golf tool may have features to permit use as a golf club support tool. This is provides for by partially inserted the multiple purpose golf tool into the ground with a golf club contact portion extending above the ground and any manicured grass growing thereon. The golf club contact portion may then have a portion of the golf club positioned thereon while a distal portion of the golf club contacts the ground. The portion of the golf club making contact with the golf club contact portion of the multiple purpose golf tool preferably will be part of the grip of the golf club while the portion of the golf club making contact with the ground will be the head of the golf club. This arrangement provides for the grip to be kept clean and dry. Many configurations may be deployed on the multiple purpose golf tool to permit a secure gravity biased retention of the grip of the golf club on the multiple purpose golf tool. When the above described spike member manipulation configuration is provided on the multiple purpose golf tool the opposing pins make ideal support members for the grip of the golf club. When this feature is not provided the associated recess may be provided which also makes an ideal support member.

Figure 8:
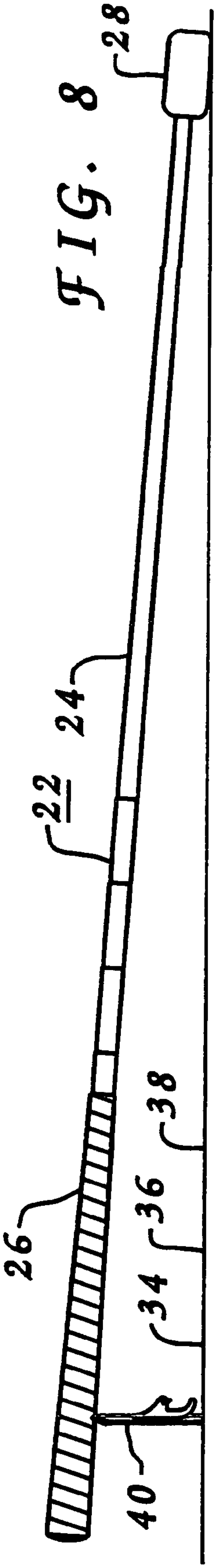
FIG. 8 is a side elevational view of the multiple purpose golf tool partially supporting the golf club above the turf of a golf course.
Figure 9A:
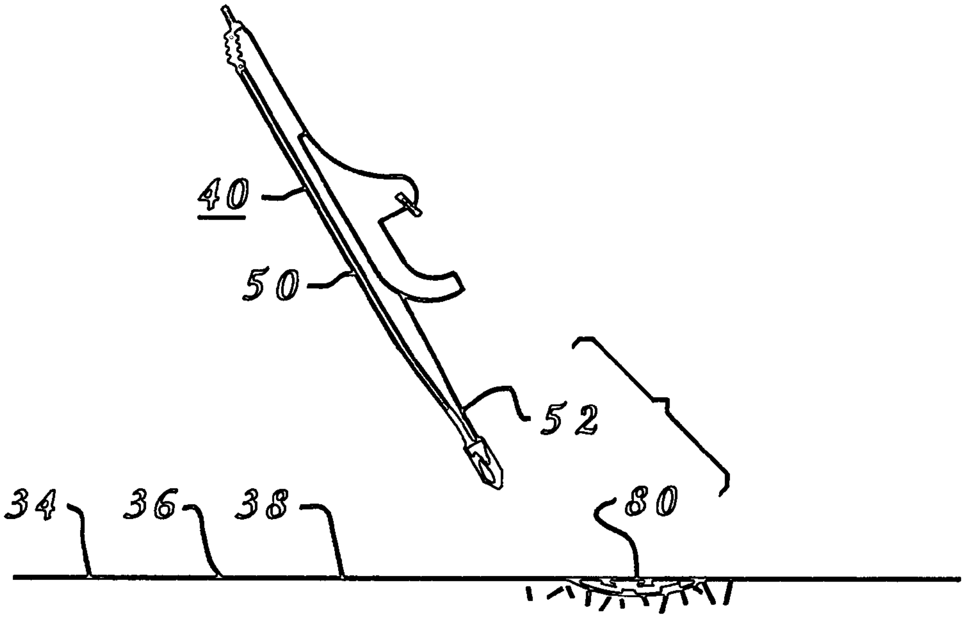
FIG. 9*a* through FIG. 9*c* are side elevational views of the multiple purpose golf tool performing a divot repair procedure.
Figure 9B:
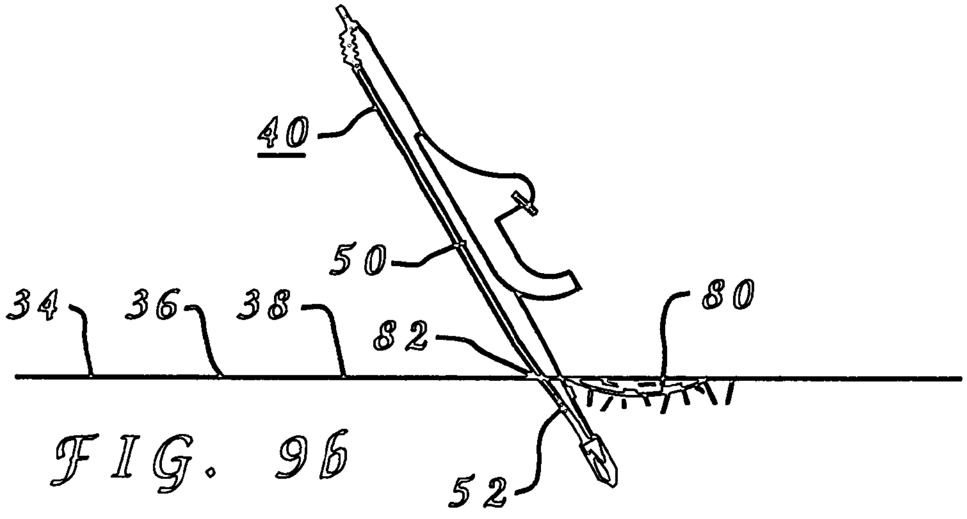
Figure 9C:
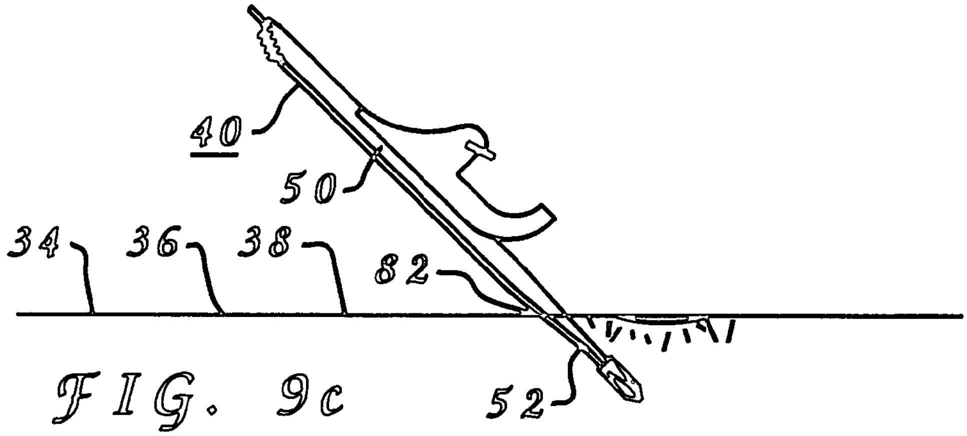
Figure 10A:
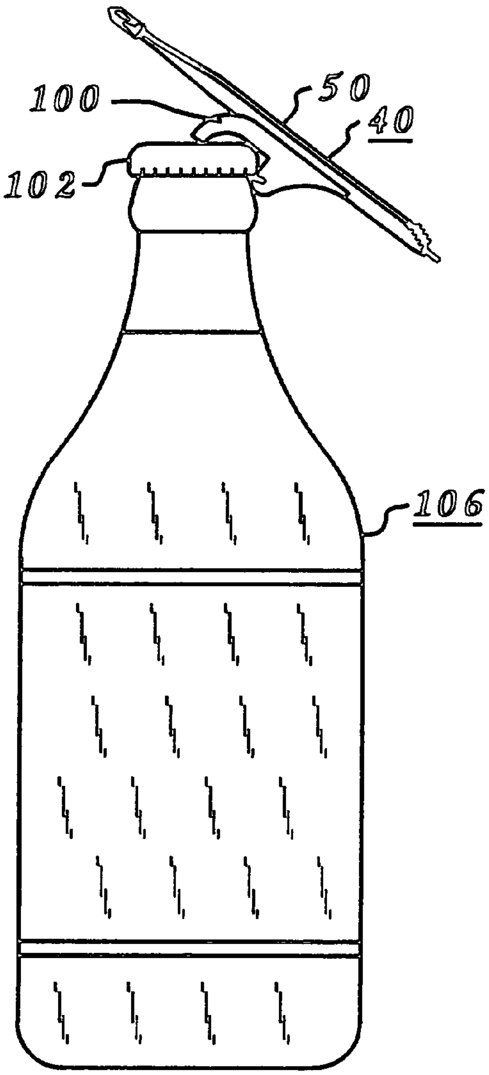
FIG. 10*a* and FIG. 10*b* are side elevational views of the multiple purpose golf tool performing a bottle opening procedure.
Figure 10B:
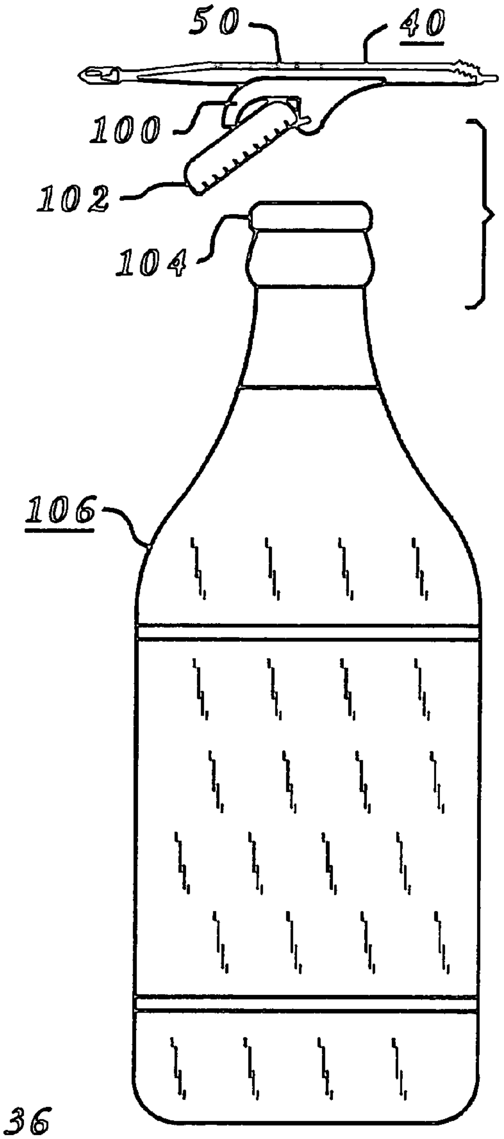
Figure 11:
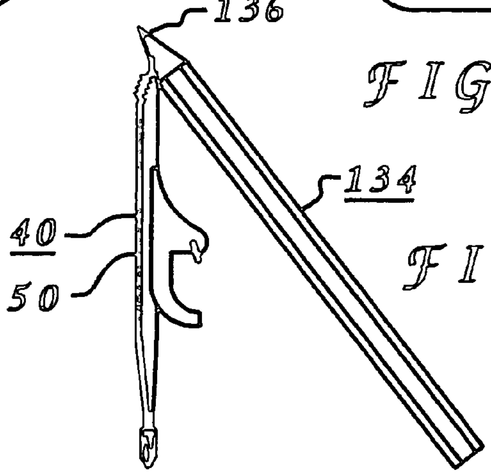
FIG. 11 is a side elevational view of the multiple purpose golf tool performing a pencil sharpening procedure.

FIG. 8 depicts multiple purpose golf tool 40 partially inserted in turf 34 and functioning as a golf club support tool where pins 116 and 118 contact and support grip 26 of golf club 22 above turf 34 while head 28 of golf club 22 rests on turf 34.

Inner surface 72 of multiple purpose golf tool 40 has a first coupling member indentation 138 situated thereon. First coupling member indentation 138 provides for first coupling member 42 to at least partially reside within first coupling member indentation 138 to provide protection during use of multiple purpose golf tool 40 to the edges of first coupling member 42.

A hook and loop type fastener assembly 140 has two (2) portions 142 and 144 with one having a hook material 146 and the other having a loop material 148. First coupling member 42 is portion 142 of hook and loop type fastener assembly 140. Portion 142 has a coupling side 150 and a backing side 152 with backing side 152 having adhesive material 44 positioned thereon and protected prior to installation by a protective sheet 154. Second coupling member 46 is portion 144 of hook and loop type fastener assembly 140. Portion 144 has a coupling side 156 and a backing side 158 with backing side 158 having adhesive material 48 positioned thereon and protected prior to installation by a protective sheet 160.

Adhesive material 44, first coupling member attachment means, provides for securing first coupling member 42 to multiple purpose golf tool 40 and specifically within the confines of first coupling member indentation 138. Adhesive material 48, second coupling member attachment means, provides for securing second coupling member 46 to shaft 24 of golf club 22. Second coupling member 46 is therefore fixedly positioned on shaft 24 of golf club 22 in close proximity to grip 26 of golf club 22. While second coupling member 46 is depicted as extending only partially around a radius of shaft 24 of golf club 22 it is possible to provide for complete encirclement if desired.

It is understood that hook material 146 may be on either first coupling member 42 or second coupling member 46 and loop material 148 may be on either first coupling member 42 or second coupling member 46. Second coupling member 46 interacts with first coupling member 42 to selectively retain first coupling member 42 and second coupling member 46 together and which provides for manual release of first coupling member 42 from second coupling member 46.

It is a requirement that the multiple purpose golf tool not be free to axially rotate about the shaft of the golf club while stored thereon. This restriction will eliminate the golfer from being distracted during play by the multiple purpose golf tool being improperly aligned on the shaft of the golf club or, even worse, moving about on the shaft of the golf club during play. Numerous structures may be employed to provide this restriction of rotation. The simplest arrangement involves securely and fixedly placing the second coupling member relative to the shaft of the golf club. This is a particularly expedient method when the coupling arrangement provides for limited lateral displacement when coupled together, such as exists with hook and loop type fasteners. Alternatively, mating structures may be provided on or relative to the golf club and on or relative to the multiple purpose golf tool which, when in contact, prevent lateral displacement. Such structural arrangements are ideally suited to magnetic coupling arrangements.

Referring now to FIG. 2 through FIG. 4*c*, a first alignment member 162 is depicted having a structural configuration 164 and positioned on first coupling member 42 which subsequently is attached to multiple purpose golf tool 40. A second alignment member 166 is depicted having a structural configuration 168 and positioned on second coupling member 46 which subsequently is attached to shaft 24 or golf club 22. Structural configuration 164 of first alignment member 162 mates with and cooperates with structural configuration 168 of second alignment member 166 to prevent incidental axial displacement of multiple purpose golf tool 40 about shaft 24 of golf club 22. First alignment member 162 is depicted on first coupling member 42 but adjacent placement on multiple purpose golf tool 40 is possible. Second alignment member 166 is depicted on second coupling member 46 but adjacent placement on shaft 24 of golf club 22 is possible.

It is a strong desire that the multiple purpose golf tool stored on the golf club be retained where significant movement of the multiple purpose golf tool toward and/or away from the golf club does not occur, particularly during handling of the golf club and particularly during play with the golf club. If desired a slightly compressible material may be placed between the multiple purpose golf tool and the shaft of the golf club. Preferably if such material is utilized for this purpose it will be attached to the shaft of the golf club. The preferred use of a hook and loop type fastener generally will ensure that this desire is ensured even when mere mating contact is provided where the fastener material does not extend along an entire length of the multiple purpose golf tool. This is due to the nature of hook and loop type fasteners which tend to provide a tensioned retention which draws the opposing portions of the fastener together during attachment. When full coverage deployment of a compressible material is desired a mere extension of a placement area of the portion of the hook and loop type fastener attached to the shaft of the golf club to ensure that upper and lower contact points of the multiple purpose golf tool will occur. It is possible, and in certain situations desirable, to provide for points of the multiple purpose golf tool to be configured to specifically make contact with points of the shaft of the golf club or on material attached to the shaft of the golf club. This arrangement could involve bending or other directional changes to surfaces or portions of the multiple purpose golf tool or structural features which extend from a surface, or surfaces, of the multiple purpose golf tool.

It is a strong desire that the multiple purpose golf tool be positioned on the golf club at a location where the presence of the multiple purpose golf tool will not distract the player during play of the game of golf and particularly while utilizing the respective golf club during play while striking the ball in play. When the golf club utilized is the preferred putter type golf club the perfect placement location is in a blind spot on the shaft directly below the grip of the club and aligned with the heel of the head of the putter. This blind spot may easily be identified by the player be taking his or her standard stance with the putter while looking down at the head of the putter as typically occurs during putting then transferring their gaze to the shaft immediately below the lower termini of the grip. An imaginary center line along the portion of the shaft visible to the player will be exactly opposite on the shaft from the center line of the blind spot. Another useful method of identifying the blind spot on many conventional putters involves resting the shaft of the putter diagonally across a square corner of a table with the grip extending beyond the surface of the table and the head extending beyond the surface of the table. Once so positioned with the shaft of the club free to roll on the surface of the table the weight of the head of the putter will move the golf club to face the blind spot of the shaft straight up. When this method is utilized it is preferred to place a piece of tape, such as masking tape, along the shaft of the golf club centered along the blind spot. Following placement of the tape in the blind spot the player would assume their standard putting stance and visually confirm centering of the tape within their respective blind spot. If not centered in their respective blind spot slight adjustment can be made to the placement of the tape. Following identification of the blind spot the respective coupling member may then be attached to the shaft of the golf club in the blind spot.

FIG. 5*a* through FIG. 6*b* depict a blind spot 170 on shaft 24 in close proximity to grip 26 and aligned with a heel 172 of head 28 of golf club, putter, 22. Blind spot 170 has attached thereto first coupling member 42.

Figure 1B:
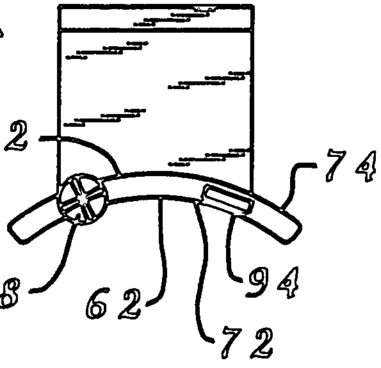
FIG. 1*b* is a bottom plan view of the multiple purpose golf tool.
Figure 1C:
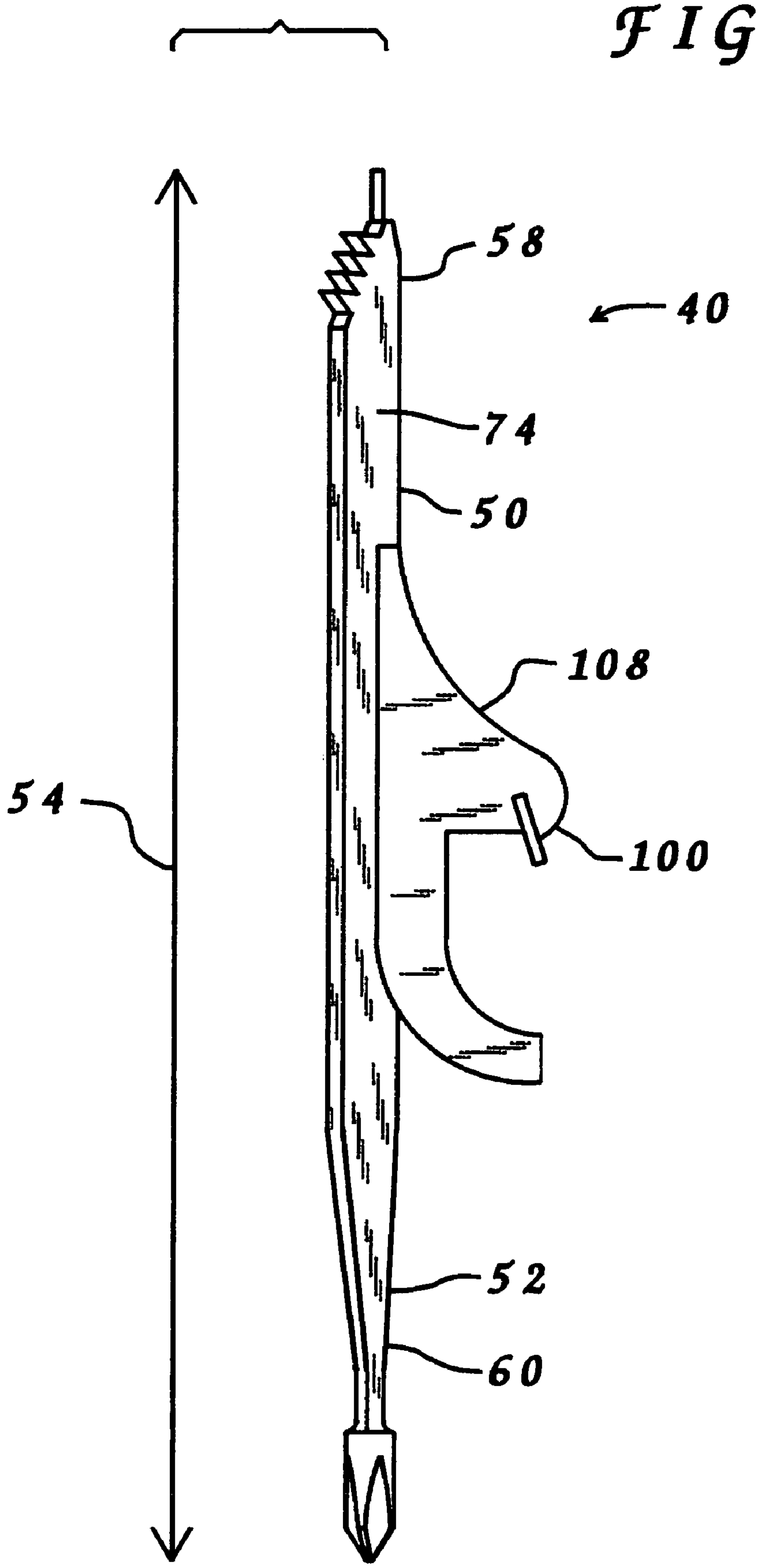
FIG. 1*c* is a side elevational view of the multiple purpose golf tool.
Figure 18:
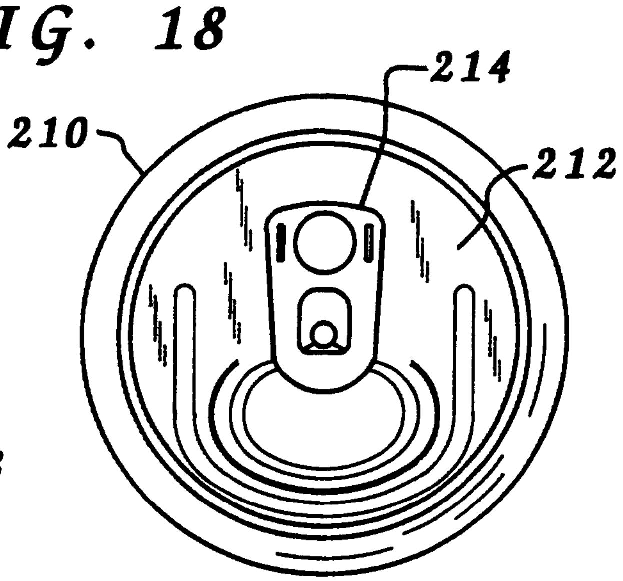
FIG. 18 is a top plan view of a top of a beverage can with a pull tab.
Figure 15:
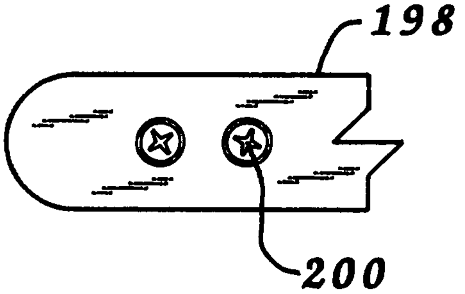
FIG. 15 is a plan view of a piece of golf equipment having a Phillip head screw.
Figure 16:
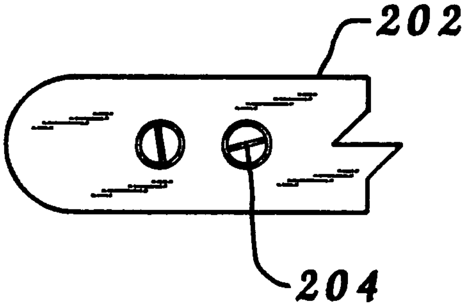
FIG. 16 is a plan view of a piece of golf equipment having a slotted head screw.
Figure 17:
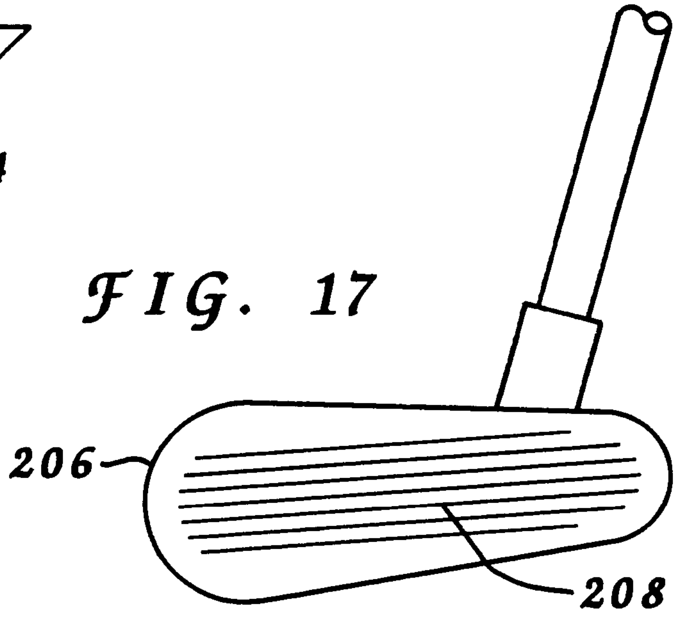
FIG. 17 is a front elevational view of a face of a golf club.

FIG. 15 depicts a piece of golf equipment 198 having a Phillips head screw 200 upon which Phillips head screw driving configuration 98, see FIG. 1, may operate. FIG. 16 depicts a piece of golf equipment 202 having a slotted head screw 204 upon which slotted head screw driving configuration 94, see FIG. 1, may operate. FIG. 17 depicts a golf club head 206 having grooves 208 thereacross. Depending upon the configuration of grooves 208 series of protrusions 84 or series of protrusions 88, see FIG. 1, may be utilized to remove material therefrom during a cleaning operation. FIG. 18 depicts a lid 210 of a beverage can 212 having a pull tab 214. End of tine 76, see FIG. 1, may be used to pry pull tab 214 away from lid 210 during an opening procedure of beverage can 212.

Figure 19:
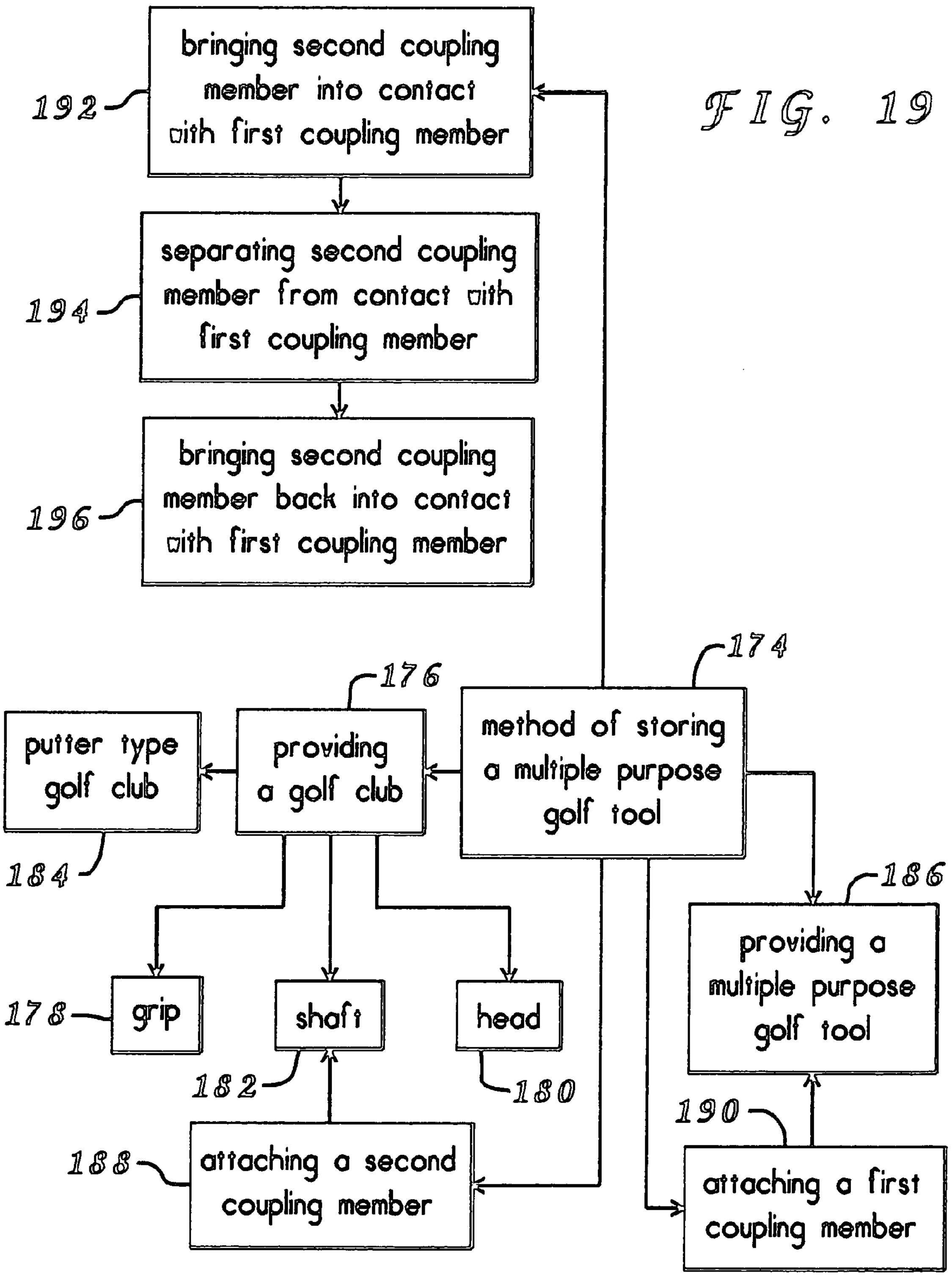
FIG. 19 is a flow chart depicting various sequences of a method of storing a multiple purpose golf tool.

FIG. 19 depicts various steps of a 'method of storing a multiple purpose golf tool' 174 of the present invention. 'Providing a golf club' 176 having a 'grip' 178, a 'head' 180 and a 'shaft' 182 extending between 'grip' 178 and 'head' 180 occurs. Preferably the 'provided golf club' 176 is a 'putter type golf club' 184. 'Providing a multiple purpose golf tool' 186 capable of performing a useful function associated with the game of golf during play of the game of golf occurs. 'Method of storing a multiple purpose golf tool' 174 provides for the 'provided multiple purpose golf tool' 186 to be stored on 'shaft' 182 of the 'provided golf club' 176 during transport of the 'provided golf club' 176 and during actual play of a game of golf with the 'provided golf club' 176 and where the stored 'provided multiple purpose golf tool' 186 does not interfere with actual play of the game of golf while the 'provided golf club' 176 upon which the 'provided multiple purpose golf tool' 186 is stored is utilized during play.

'Attaching a second coupling member' 188 occurs to 'shaft' 182 of the 'provided golf club' 176 in close proximity to 'grip' 178 of the 'provided golf club' 176. 'Attaching a first coupling member' 190 occurs to 'provided multiple purpose golf tool' 186.

'Bringing second coupling member into contact with first coupling member' 192 occurs to store 'provided multiple purpose golf tool' 186 on 'provided golf club' 176. 'Separating second coupling member from contact with first coupling member' 194 occurs to remove 'provided multiple purpose golf tool' 186 from 'provided golf club' 176 for use of the multiple purpose golf tool for a useful purpose. 'Bringing second coupling member back into contact with first coupling member' 196 occurs following use of the multiple purpose golf tool for the useful purpose to again store 'provided multiple purpose golf tool' 186 on 'provided golf club' 176.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multiple purpose golf tool to provide for performance of multiple useful functions during play of the game of golf, the multiple purpose golf tool comprising:

a) a turf penetration portion to perform a first useful function associated with the play of the game of golf, the first useful function being release of compression of turf associated with an impact from a golf ball, the turf penetration portion for insertion into the turf at a point of insertion and then manual manipulation of the multiple purpose golf tool to displace the turf penetration portion while inserted in the turf to release the compression of the turf about the point of insertion of the turf penetration portion and wherein the turf penetration portion further comprises a first extension and a second extension;

b) a club support arrangement to perform a second useful function associated with the play of the game of golf, the club support arrangement positioned distal on the multiple purpose golf tool from the turf repair tool, the club support arrangement having a first club contact portion and a second club contact portion, the first club contact portion and the second club contact portion to contact a golf club spaced from a head of the golf club while the turf penetration portion of the multiple purpose golf tool is inserted into ground wherein a grip of the club is supported above the ground, the second useful purpose being supporting at least the grip of the club about the ground;

c) structural configuration to perform a third useful function associated with the play of the game of golf and wherein the structural configuration to perform the third useful function associated with the play of the game of golf and positioned on at a distal end of the first extension of the turf penetration portion, the third useful function being applying a rotational pressure to a slot of a slotted head screw utilizing a slotted head screwdriver configuration at the distal end of the first extension of the turf penetration portion;

d) structural configuration to perform a fourth useful function associated with the play of the game of golf and wherein the structural configuration to perform the fourth useful function associated with the play of the game of golf and positioned on at a distal end of the second extension of the turf penetration portion, the fourth useful function being applying a rotational pressure to a phillips slot of a phillips slotted head screw utilizing a phillips slotted head screwdriver configuration at the distal end of the second extension of the turf penetration portion.

2. The multiple purpose golf tool defined in claim 1 wherein the club support arrangement further comprises a golf shoe spike install/removal tool wherein the first club contact portion has a distal end configured to engage an engagement portion of a golf shoe spike and wherein the second club contact portion has a distal end configured to engage an engagement portion of the golf shoe spike wherein the multiple purpose golf tool is axially rotated while the first and second club contact portions are engaging the golf shoe spike to transfer an installation rotation or a removal rotation to the golf shoe spike.

3. The multiple purpose golf tool defined in claim 1 further comprising an attachment assembly to provide for removable attachment of the multiple purpose golf tool to a shaft of a golf club in close proximity to a grip of the golf club during transport of the golf club and during actual play with the golf club where the multiple purpose golf tool does not interfere with actual play with the golf club, the assembly comprising:

a) a first coupling member;

b) first coupling member attachment means to secure the first coupling member to the multiple purpose golf tool;

c) a second coupling member which interacts with the first coupling member to selectively retain the first coupling member and the second coupling member together and which provides for manual release of the first coupling member from the second coupling member;

d) second coupling member attachment means to fixedly position the second coupling member to the shaft of the golf club in close proximity to the grip of the golf club;

wherein the multiple purpose golf tool is able to be removably attached to the shaft of the golf club in close proximity to the grip of the golf club during transport of the golf club and during actual play with the golf club where the stored multiple purpose golf tool does not interfere with actual play with the golf club.

4. The multiple purpose golf tool defined in claim 1 wherein the multiple purpose golf tool further comprises a longitudinal orientation and a lateral orientation and wherein the multiple purpose golf tool has a curvature across at least a portion of the lateral orientation along at least a substantial portion of the longitudinal orientation.

5. The multiple purpose golf tool defined in claim 1 wherein multiple purpose golf tool further comprises a longitudinal orientation, an upper end and a lower end and wherein the upper end and the lower end are at opposing ends of the multiple purpose golf tool along the longitudinal orientation and wherein the upper end has a lateral width and wherein the lower end has a lateral width and wherein the lateral width of the upper end is substantially greater than the lateral width of the lower end.

6. The multiple purpose golf tool defined in claim 1 wherein the multiple purpose golf tool further comprises a grip portion having a first lateral edge and a second lateral edge and;

wherein the structural configuration to perform the third useful function associated with the play of the game of golf further comprises a series of protrusions positioned on the first lateral edge, the series of protrusions positioned on the first lateral edge having a first configuration measurement and wherein the third useful function comprises club face groove cleaning;

wherein the structural configuration to perform the fourth useful function associated with the play of the game of golf further comprises a series of protrusions on the second lateral edge, the series of protrusions positioned on the second lateral edge having a second configuration measurement and wherein the fourth useful function comprises golf shoe spike cleaning and wherein the first configuration measurement is substantially unique from the second configuration measurement.

7. The multiple purpose golf tool defined in claim 1 wherein the structural configuration to perform the third useful function associated with the play of the game of golf further comprises a protected sharpened edge on the multiple purpose golf tool and wherein the third useful function comprises sharpening of a pencil, and;

wherein the structural configuration to perform the fourth useful function associated with the play of the game of golf further comprises opposing engagement member positioned on the multiple purpose golf tool wherein one of the opposing engagement members is able to engage a bottle cap positioned on a bottle while the opposing engagement member engages the bottle cap positioned on the bottle spaced a while a pivotal action is exerted through the multiple purpose golf tool to disengage the bottle cap from the bottle and wherein the fourth useful function comprises removal of a bottle cap from a bottle.

8. The multiple purpose golf tool defined in claim 1 wherein the structural configuration to perform the third useful function associated with the play of the game of golf further comprises a pry protrusion for insertion between a pull tab of a beverage can and a lid of the beverage can having the pull tab positioned thereon and wherein the third useful function comprises lifting a beverage can pull tab relative to the beverage can, and;

wherein the structural configuration to perform the fourth useful function associated with the play of the game of golf further comprises opposing engagement member positioned on the multiple purpose golf tool wherein one of the opposing engagement members may engage a bottle cap positioned on a bottle while the opposing engagement member engages the bottle cap positioned on the bottle spaced a while a pivotal action is exerted through the multiple purpose golf tool to disengage the bottle cap from the bottle and wherein the fourth useful function comprises removal of a bottle cap from a bottle.

9. The multiple purpose golf tool defined in claim 1 wherein the club support arrangement further comprises a golf shoe spike install/removal tool wherein the first club contact portion has a distal end configured to engage an engagement portion of a golf shoe spike and wherein the second club contact portion has a distal end configured to engage an engagement portion of the golf shoe spike wherein the multiple purpose golf tool is axially rotated while the first and second club contact portions are engaging the golf shoe spike to transfer an installation rotation or a removal rotation to the golf shoe spike and wherein the third useful function comprises install and removal of a golf shoe spike relative to a golf shoe, and;

wherein the structural configuration to perform the fourth useful function associated with the play of the game of golf further comprises a protected sharpened edge positioned generally between the first club contact portion and the second club contact portion and wherein the fourth useful function comprises sharpening of a pencil.

10. A multiple purpose golf tool to provide for performance of multiple useful functions during play of the game of golf, the multiple purpose golf tool comprising:

a) a turf penetration portion to perform a first useful function associated with the play of the game of golf, the first useful function being release of compression of turf associated with an impact from a golf ball, the turf penetration portion having a first extension and a second extension, the turf penetration portion for insertion into the turf at a point of insertion and then manual manipulation of the multiple purpose golf tool to displace the turf penetration portion while inserted in the turf to release the compression of the turf about the point of insertion of the turf penetration portion;

b) a structural configuration to perform a second useful function associated with the play of the game of golf and positioned on at a distal end of the first extension of the turf penetration portion, the second useful function being applying a rotational pressure to a slot of a slotted head screw utilizing a slotted head screwdriver configuration at the distal end of the first extension of the turf penetration portion;

c) a structural configuration to perform a third useful function associated with the play of the game of golf and positioned on at a distal end of the second extension of the turf penetration portion, the third useful function being applying a rotational pressure to a phillips slot of a phillips slotted head screw utilizing a phillips slotted head screwdriver configuration at the distal end of the second extension of the turf penetration portion;

d) structural configuration to perform a fourth useful function associated with the play of the game of golf.

11. The multiple purpose golf tool defined in claim 10 further comprising an attachment assembly to provide for removable attachment of the multiple purpose golf tool to a shaft of a golf club in close proximity to a grip of the golf club during transport of the golf club and during actual play with the golf club where the multiple purpose golf tool does not interfere with actual play with the golf club, the assembly comprising:

a) a first coupling member;

b) first coupling member attachment means to secure the first coupling member to the multiple purpose golf tool;

c) a second coupling member which interacts with the first coupling member to selectively retain the first coupling member and the second coupling member together and which provides for manual release of the first coupling member from the second coupling member;

d) second coupling member attachment means to fixedly position the second coupling member to the shaft of the golf club in close proximity to the grip of the golf club;

wherein the multiple purpose golf tool is able to be removably attached to the shaft of the golf club in close proximity to the grip of the golf club during transport of the golf club and during actual play with the golf club where the stored multiple purpose golf tool does not interfere with actual play with the golf club.

12. The multiple purpose golf tool defined in claim 10 wherein the multiple purpose golf tool further comprises a longitudinal orientation and a lateral orientation and wherein the multiple purpose golf tool has a curvature across at least a portion of the lateral orientation along at least a substantial portion of the longitudinal orientation.

13. The multiple purpose golf tool defined in claim 10 wherein the multiple purpose golf tool further comprises a grip portion having a first lateral edge and a second lateral edge and wherein the structural configuration to perform the fourth useful function associated with the play of the game of golf further comprises a series of protrusions positioned on the first lateral edge, the series of protrusions positioned on the first lateral edge having a first configuration measurement and wherein the fourth useful function comprises club face groove cleaning.

14. The multiple purpose golf tool defined in claim 10 wherein the multiple purpose golf tool further comprises a grip portion having a first lateral edge and a second lateral edge and wherein the structural configuration to perform the fourth useful function associated with the play of the game of golf further comprises a series of protrusions on the second lateral edge, the series of protrusions positioned on the second lateral edge having a second configuration measurement and wherein the fourth useful function comprises golf shoe spike cleaning.

15. The multiple purpose golf tool defined in claim 10 wherein the multiple purpose golf tool further comprises a longitudinal orientation and an upper end positioned along the longitudinal orientation and wherein the structural configuration to perform the fourth useful function associated with the play of the game of golf further comprises a first protruding pin extending from the upper end and a second protruding pin extending from the upper end, the first protruding pin to engage an engagement portion of the golf shoe spike and the second protruding pin to engage an engagement portion of the golf shoe spike wherein the multiple purpose golf tool is axially rotated while the first protruding pin and the second protruding pin are engaging the golf shoe spike to transfer an installation rotation or a removal rotation to the golf shoe spike relative to a golf shoe.

16. The multiple purpose golf tool defined in claim 10 wherein the turf penetration portion further comprises a first extension and a second extension wherein the structural configuration to perform the fourth useful function associated with the play of the game of golf and positioned on at a distal end of the second extension of the turf penetration portion, the fourth useful function being applying a rotational pressure to a phillips slot of a phillips slotted head screw utilizing a phillips slotted head screwdriver configuration at the distal end of the second extension of the turf penetration portion.

17. The multiple purpose golf tool defined in claim 10 wherein the turf penetration portion further comprises a first extension and a second extension wherein the structural configuration to perform the fourth useful function associated with the play of the game of golf and positioned on at a distal end of the first extension of the turf penetration portion, the fourth useful function being applying a rotational pressure to a slot of a slotted head screw utilizing a slotted head screwdriver configuration at the distal end of the first extension of the turf penetration portion.

18. The multiple purpose golf tool defined in claim 10 wherein the structural configuration to perform the fourth useful function associated with the play of the game of golf further comprises a protected sharpened edge on the multiple purpose golf tool and wherein the fourth useful function comprises sharpening of a pencil.

19. The multiple purpose golf tool defined in claim 10 wherein the structural configuration to perform the fourth useful function associated with the play of the game of golf further comprises opposing engagement member positioned on the multiple purpose golf tool wherein one of the opposing engagement members is able to engage a bottle cap positioned on a bottle while the opposing engagement member engages the bottle cap positioned on the bottle spaced a while a pivotal action is exerted through the multiple purpose golf tool to disengage the bottle cap from the bottle and wherein the fourth useful function comprises removal of a bottle cap from a bottle.

* * * * *